Jan. 2, 1951  A. WATSON  2,536,336
ANIMAL KILLER
Filed May 29, 1946  2 Sheets-Sheet 1
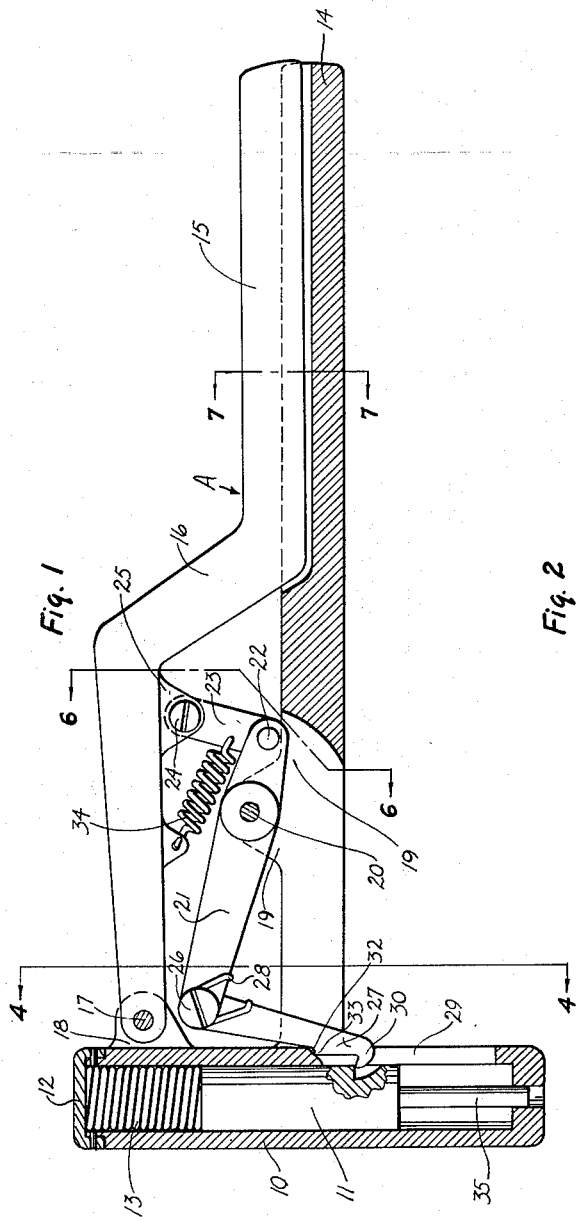
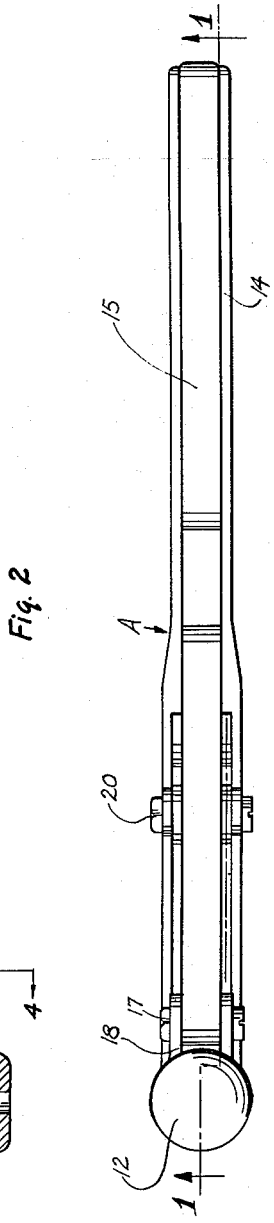
INVENTOR.
ARTHUR WATSON
BY *Victor J. Evans & Co.*
ATTORNEYS

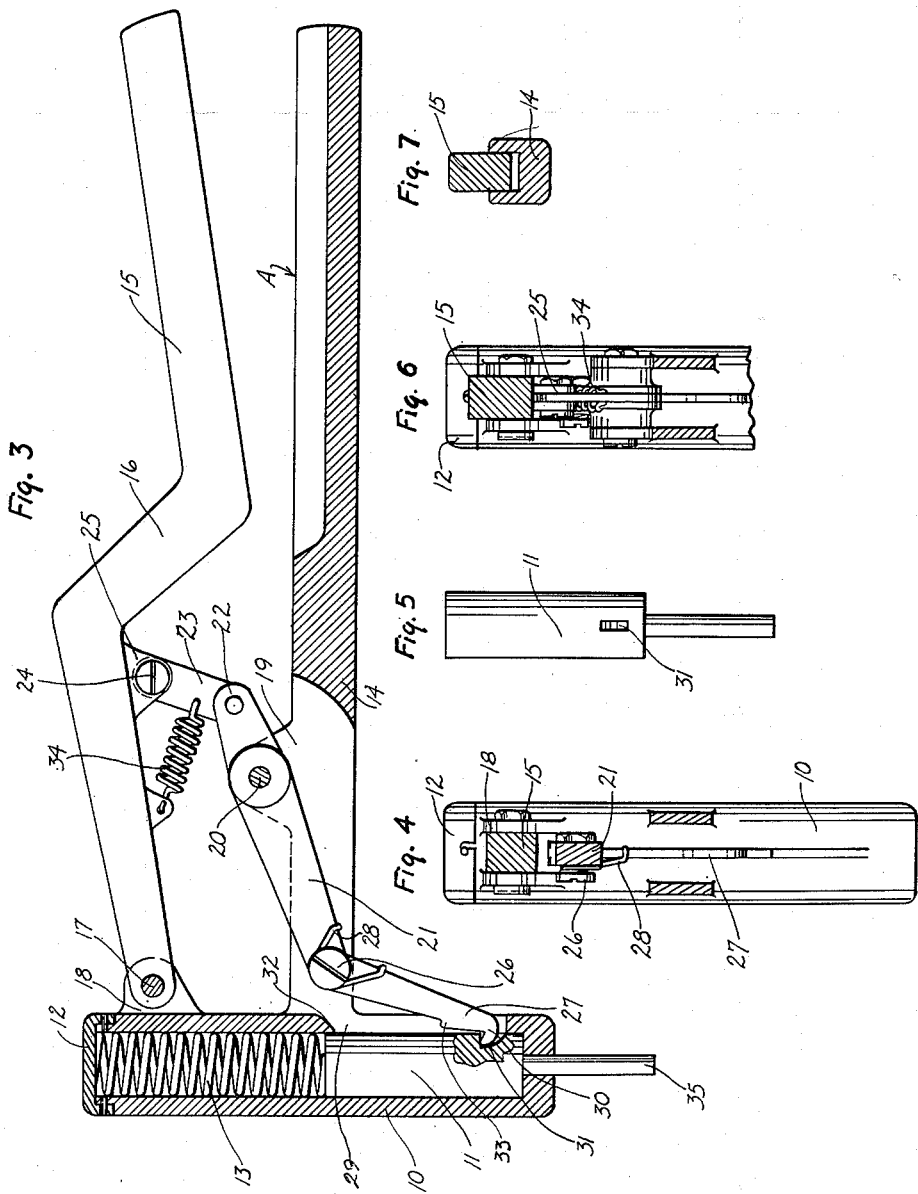

Patented Jan. 2, 1951

2,536,336

UNITED STATES PATENT OFFICE 2,536,336

ANIMAL KILLER

Arthur Watson, Eldorado, Ill.

Application May 29, 1946, Serial No. 672,977

1 Claim. (Cl. 17—1)

The invention relates to a killing gadget, and more especially to an animal killing instrument or tool.

The primary object of the invention is the provision of an instrument or tool of this character, wherein horses, cattle, dogs and other animals can in a positive, quick and painless manner, be conveniently killed, the instrument or tool being of novel construction, and is unique in the assembly thereof.

Another object of the invention is the provision of an instrument or tool of this character, wherein a penetrating tine, which is adapted to penetrate the brain or skull of an animal, thus paralyzing the heart and causing instantaneous painless death, is trigger controlled, and manually operated in the use thereof.

A further object of the invention is the provision of an instrument or tool of this character, which is simple in construction, thoroughly reliable and efficient in operation, strong, durable, readily and easily handled, operable with dispatch, possessed of few parts, thus economical in repairs and replacements, quick acting, and operated, and inexpensive to manufacture.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is a side elevation, partly in vertical section, of the instrument or tool on the line 1—1 of Fig. 2 constructed in accordance with the invention.

Figure 2 is a top plan view.

Figure 3 is a view similar to Figure 1 showing the instrument or tool in a released position.

Figure 4 is a sectional view taken on the line 4—4 of Figure 1 looking in the direction of the arrows.

Figure 5 is a detail side view of the tine plunger.

Figure 6 is a sectional view taken approximately on the line 6—6 of Figure 1 looking in the direction of the arrows.

Figure 7 is a sectional view taken on the line 7—7 of Figure 1 looking in the direction of the arrows.

Similar reference characters indicate corresponding parts throughout the several views in the drawings.

Referring to the drawings in detail, the instrument or tool denoted generally at A constituting the present invention, comprises a cylindrical head forming a plunger barrel 10, in which reciprocates a striking or blow impact plunger 11, the barrel 10 being fitted with a removable top cap 12, and within such barrel aft of the plunger 11 is a coiled expansion spring 13, which acts directly on the plunger for imparting quick sliding action thereto in one direction.

The barrel 10 is formed with a handle 14, which is adapted to extend a distance therefrom, preferably at right angles to its length, while above this handle 14 is an operating lever 15 having the intermediate elbow 16, and this lever is connected by a pivot 17 to a bearing ear 18 formed on the barrel 10 next to its uppermost end, while rising from the handle 14 in advance of the elbow 16 is a pivot bearing 19, in which is connected by a pivot 20 a rocking arm 21, the pivot 20 being located close to the outer end of the said arm, and to this end is connected by a pivot 22 a link 23, which by a pivot 24 is connected to a pivot ear 25 depending from the lever 15.

At the inner end of the arm 21 is connected by a pivot 26 a spring tensioned latching trigger 27, the spring 28 therefor being engaged therewith and the arm, to exert a tension on the latter to urge it through an elongated slot 29 in the barrel 10, to effect snap engagement of its latching terminal 30 in a keeper notch 31 in the plunger 11 within said barrel, the release of the trigger from the plunger being effected by a camming surface contact 32 and a shoulder 33, respectively, when the trigger reaches a determined position relative to the barrel 10.

The link 23 has connected thereto a tensioning spring 34 which is also connected to the lever 15, as best seen in Figures 1 and 3 of the drawings. In Figure 1 of the drawings the trigger 27 is shown in releasing position with respect to the plunger 11, while in Figure 3 it is shown in latching position therewith. When the trigger 27 has released the plunger 11 it is under tension by the spring 13, which sends such plunger under great force in one direction, so that the penetrating tine 35 on the same will be projected through a clearance therefor in the lower end of the barrel 10, outwardly thereof, to pierce the skull of an animal, whereby it can be instantly killed in the use of the instrument or tool A, as should be obvious.

The lever 15 when actuated retreats the plunger 11 inwardly of the barrel 10 against the resistance of the spring 13, and on completion of the inward stroke of this plunger the trigger 27 releases the same, whereby it will be free for the projecting of the tine 35 outwardly of the barrel for the purpose stated. The handle and lever are brought together for the release of the plunger 11 from the trigger 27, and on the engagement of the trigger with the said plunger, the handle and lever are separated from each other under the action of the spring 34, these distinct positions being disclosed in Figures 1 and 3 of the drawings. The instrument or tool A is manually controlled in the use thereof.

What is claimed is:

A tool of the kind described comprising a plunger barrel having an elongated slot therein, a camming surface formed in the barrel at the upper end of the slot, a plunger having a notch in the lower end thereof slidably fitted in said barrel, tensioning means within the barrel for the plunger, a piercing tine on the plunger for projection from the barrel into the head of an animal, a handle formed on the barrel at right angles thereto, a setting lever pivoted on said barrel to lie in a plane parallel to the handle, a rocking arm pivoted to said handle below said lever, a link pivotally connecting one end of said arm to said lever, a trigger having a hooked end and a shoulder adjacent the hooked end pivoted to the other end of the arm, a spring tensioning said trigger to urge the trigger through the slot in the barrel into engagement with the notch in the plunger, and said lever when moved toward said handle is adapted to move said plunger against the tensioning means in the barrel until the shoulder on the trigger engages the camming surface in the barrel to release the trigger from the notch to release the plunger, and tensioning means connected to the lever and link to return the lever to a position for a re-engagement of the hooked end of the trigger with the notch in the plunger.

ARTHUR WATSON.

REFERENCES CITED

The following references are of record in the file of this patent:

UNITED STATES PATENTS

| Number | Name | Date |
|---|---|---|
| 1,214,929 | Larson | Feb. 6, 1917 |
| 1,664,788 | Oberhammer | Apr. 3, 1928 |
| 1,418,021 | Reifgraber | May 30, 1922 |

FOREIGN PATENTS

| Number | Country | Date |
|---|---|---|
| 10,484 | Great Britain | of 1912 |
| 10,601 | Great Britain | of 1895 |